United States Patent [19]

Inoue et al.

[11] Patent Number: 4,794,163

[45] Date of Patent: Dec. 27, 1988

[54] PROCESS FOR PRODUCING A POLYARYLENE SULFIDE WITH ALKALI METAL SALT OF PYRIDINE CARBOXYLIC ACID CATALYST

[75] Inventors: Hiroshi Inoue; Toshikazu Kato; Noriaki Emura, all of Yokkaichi, Japan

[73] Assignees: Tosoh Corporation; Toso Susteel Co., Ltd., both of Japan

[21] Appl. No.: 136,593

[22] Filed: Dec. 22, 1987

[30] Foreign Application Priority Data

Dec. 22, 1986 [JP] Japan ............................ 61-303655

[51] Int. Cl.$^4$ ............................................. C08G 75/16
[52] U.S. Cl. ................................................ 528/388
[58] Field of Search ........................................ 528/388

[56] References Cited

U.S. PATENT DOCUMENTS

| | | | |
|---|---|---|---|
| 3,354,129 | 11/1967 | Edmonds et al. | 528/388 |
| 3,867,356 | 2/1975 | Campbell | 528/388 |
| 3,919,177 | 11/1975 | Campbell | 528/388 |
| 4,038,261 | 7/1977 | Crouch et al. | 528/388 |
| 4,038,262 | 7/1977 | Edmonds | 528/388 |
| 4,064,114 | 12/1977 | Edmonds | 528/388 |
| 4,116,947 | 9/1978 | Edmonds et al. | 528/388 |
| 4,282,347 | 8/1981 | Tieszen et al. | 528/388 |
| 4,661,584 | 4/1987 | Idel et al. | 528/388 |

Primary Examiner—Harold D. Anderson
Attorney, Agent, or Firm—Sughrue, Mion, Zinn, Macpeak, and Seas

[57] ABSTRACT

A polyarylene sulfide having a high molecular weight, a high purity, excellent color tone and excellent heat stability is produced by carrying out a polymerization reaction between a dihalogenated aromatic compound and a sulfur source in an organic amide solvent and in the presence of an alkali metal salt of pyridine-carboxylic acid. Such a polyarylene sulfide is very useful for utilization in electronic components, automotive parts, etc.

3 Claims, No Drawings

PROCESS FOR PRODUCING A POLYARYLENE SULFIDE WITH ALKALI METAL SALT OF PYRIDINE CARBOXYLIC ACID CATALYST

BACKGROUND OF THE INVENTION

1. Field of the Invention

This invention relates to a process for producing a polyarylene sulfide and, more particularly, to a process for producing a polyarylene sulfide having a high molecular weight, a high purity, excellent color tone and excellent heat stability.

Polyarylene sulfide (for example, a polyphenylene sulfide), having excellent heat resistance and excellent chemical resistance, has attracted special attention for use in electronic components and automotive parts. Being moldable into various formed parts, films, sheets, fibers, etc. by injection, extrusion or other molding process, polyarylene sulfide is widely used in fields where heat resistance is needed.

2. Description of the Prior Art

Japanese Patent Publication No. 3368/1970 discloses a process for producing a polyarylene sulfide wherein the reaction between a dihalogenated aromatic compound and a sulfur source such as sodium sulfide or the like is conducted in an organic amide solvent such as N-methyl-2-pyrrolidone.

However, the molecular weight of the polymer obtained by this process is not sufficiently high to be used for injection molding or the like. Therefore, this low-molecular weight polymer is heated in the air so as to be crosslinked through oxidation, thereby enabling the polymer to be used for molding process. However, even such a polymer having an increased molecular weight suffers from inferior extrudability which may be attributed to the high level of crosslinking and branching, so that it has heretofore been difficult to form said polymer into films or fibers.

Under these circumstances, processes for obtaining a high-molecular weight polyarylene sulfide through polymerization reaction have been proposed. A typical example of this type of prior art is a process disclosed in Japanese Patent Publication No. 12240/1977 in which polymerization reaction is conducted in the presence of R-COOM (R is a hydrocarbyl group and M is an alkali metal) which is employed as a polymerization auxiliary. The high-molecular weight polymer obtained in this way is considered to be excellent in terms of extrudability and hence applicable to formation of films, fibers, etc.

The above-described process, however, causes the corrosion of reaction vessels, resulting in elution of heavy metals into the resulting polymer. Therefore, a significant amount of heavy metals remains in the polymer produced by said reaction, which unfavorably causes a reduction in color tone and heat stability and the like.

SUMMARY OF THE INVENTION

It is therefore an object of the present invention to provide an improved process for producing a polyarylene sulfide having a high molecular weight, a high purity, excellent color tone and excellent heat stability.

Other objects and advantages of the present invention will become apparent to those skilled in the art from the following description and disclosure.

DETAILED DESCRIPTION OF THE PREFERRED EMBODIMENT

The present invention relates to a process for producing a polyarylene sulfide, which comprises carrying out a polymerization reaction between a dihalogenated aromatic compound and a sulfur source in an organic amide solvent and in the presence of an alkali metal salt of pyridine-carboxylic acid. The present invention will be described hereinunder in detail.

The polymerization auxiliary which is employed in the present invention in order to attain its object is an alkali metal salt of pyridine-carboxylic acid of the formula:

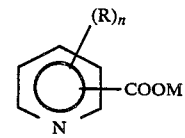

(wherein R is an organic group having 1 to 20 carbon atoms, M is an alkali metal, and n is an integer having a value of 0 to 4). R in the formula is an organic group having 1 to 20 carbon atoms, which may contain a group of ketone, amide, sulfone, etc. which are inert during polymerization. M in the formula is an alkali metal, preferably lithium or sodium or potassium. Examples of alkali metal salts of pyridine-carboxylic acid usable in the present invention are lithium nicotinate, sodium nicotinate, potassium nicotinate, sodium picolinate, sodium isonicotinate, sodium 2-methylnicotinate, sodium 4-methylnicotinate, sodium 5-methylnicotinate, sodium 6-methylnicotinate, sodium 3-methylpicolinate, sodium 5-methylpicolinate, sodium 2,4-dimethylnicotinate, sodium 2,5-dimethylnicotine, sodium 2,6-dimethylnicotinate, sodium 4,6-dimethylnicotinate, sodium 5,6-dimethylnicotinate, sodium 3,5-dimethylpicolinate, and sodium 4,6-dimethylpicolinate. These alkali metal salts of pyridinecarboxylic acid may be used in the form of a mixture consisting of two or more of them. The amount of the alkali metal salt of pyridine-carboxylic acid used is usually in the range of 0.05 to 3 moles, preferably 0.1 to 2 moles, per mole of dihalogenated aromatic compound. If the amount of the alkali metal salt of pyridine-carboxylic acid is excessively small, the resulting polymer unfavorably possesses a reduced molecular weight, whereas, if said amount is excessively large, it becomes difficult to stir the mixture in the reaction vessel. The alkali metal salt of pyridine-carboxylic acid may be added any time before the dihalogenated aromatic compound is added to start polymerization.

The production of a polyarylene sulfide, which is generally carried out under high-temperature and strong-alkali conditions, causes the corrosion of reaction vessels made of iron or stainless steel, resulting unfavorably in elution of heavy metals such as iron or the like into the resulting polymer.

However, it has been confirmed that the presence of an alakli metal salt of pyridine-carboxylic acid in the polymerization system considerably suppresses the corrosion of the reaction vessel although the reason for this has not yet been clairifed. Accordingly, it is possible to obtain a high-molecular weight polyarylene sulfide having a high purity, excellent color tone and excellent heat stability without the need to form the reaction vessel for a titanium, chromium, molybdenum, tungsten or a stainless steel containing a large amount of these metals.

Preferable polymerization solvents usable in the present invention are polar solvents, particularly preferably aprotic polar solvents which are stable to alkalis at high temperatures. Examples of them include N,N-dimethylacetamide, N,N-dimethylformamide, dimethyl sulfoxide, hexamethylphosphoramide, N-methyl-ε-caprolactam, N-ethyl-2-pyrrolidone, N-methyl-2-pyrrolidone and 1,3-dimethyl-2-imidazolidinone. Among them, N-methyl-2-pyrrolidone (hereinafter referred to as "NMP") is most preferable.

Examples of the sulfur source usable in the present invention include alkali metal sulfides, combinations of alkali metal hydrosulfides and alkali metal bases, and combinations of hydrogen sulfide and alkali metal bases. Alkali metal sulfides and alkali metal hydrosulfides may be used in the form of hydrates. These sulfur sources may be prepared in the polymerization system in situ prior to the addition of a dihalogenated aromatic compound into the system, or may be prepared outside the system and then added thereinto. It is preferable, before the dihalogenated aromatic compound is added to start polymerization, to remove the water content in the system by distillation or the like so that the amount of water is 1.5 moles or less per mole of sulfur source. Preferable sulfur sources usable in the present invention are sodium sulfide, a combination of sodium hydrosulfide and sodium hydroxide, and a combination of hydrogen sulfide and sodium hydroxide.

Examples of dihalogenated aromatic compounds usable in the present invention include p-dichlorobenzene, m-dichlorobenzene, o-dichlorobenzene, p-dibromobenzene, dichloronaphthalene, dibromonaphthalene, dichlorodiphenyl sulfone, dichlorobenzophenone, dichlorodiphenyl ether, dichlorodiphenyl sulfide, dichlorodiphenyl dibromodiphenyl and dichlorodiphenyl sulfoxide. Among them, p-dihalogenated benzenes are preferable, and p-dichlorobenzene is particularly preferable. Further, a small amount of polyhalogenated aromatic compound, for example, trichlorobenzene, tetrachlorobenzene, trichloronaphthalene, etc., may be used in combination in such a range that the linearity of the resulting polymer will not be affected.

Polymerization in the present invention is conducted ordinarily at 200° to 300° C., preferably 220° to 280° C., for 0.5 to 10 hours, preferably 1 to 5 hours, with stirring. The amount of the dihalogenated aromatic compound used in the present invention is usually in the range of 0.95 to 1.10 moles per mole of a sulfur source, and the amount of solvent usable in the present invention is in such a range that the amount of polymer produced during the polymerization is 5 to 60% by weight, preferably 10 to 50% by weight, with respect to the solvent.

Separation of the polyarylene sulfide from the reaction mixture obtained in this way may be effected using conventional techniques. Examples of separation means usable in the present invention include a method wherein, after the solvent has been recovered by distillation, flashing or the like, the resulting polymer is washed with water and then obtained, and a method wherein, after the reaction mixture has been filtered, the resulting polymer is washed with water and then obtained.

A typical practical example of polyarylene sulfides produced by the process of the present invention may be poly-(p-phenylene sulfide)

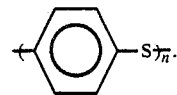

Examples of other polyarylene sulfides producible in the present invention include polyphenylene sulfide sulfone

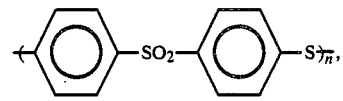

polyphenylene sulfide ketone

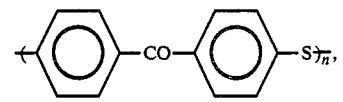

polyphenylene sulfide ether

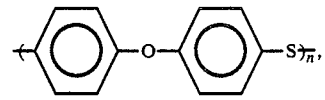

polydiphenylene sulfide

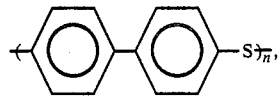

and copolymers including two or more of repeating units such as those mentioned above.

The polyarylene sulfide obtained according to the present invention has not only an increased molecular weight but also a high purity, excellent color tone and excellent heat stability and is therefore suitable for use in the form of extruded articles such as fibers, films, pipes, etc. in addition to injection-molded articles. The polyarylene sulfide may be mixed with a reinforcing filler (e.g., glass fiber), an inorganic filler (e.g., calcium carbonate, talc, or mica), a pigment, etc. as desired.

EXAMPLES

The present invention will be explained more specifically below by way of Examples. However, the present invention is in no way restricted to these Examples.

The melt viscosity of the polyarylene sulfides produced in the following Examples and Comparative Examples was measured with a flow tester (die: diameter=0.5 mm; length=2 mm) at 300° C. and under a load of 10 kg. The content of heavy metal in the polyarylene sulfides was measured by atomic absorption spectometry.

EXAMPLE 1

In a SUS 316, 500-milliliter autoclave were placed 0.612 mole of $Na_2S.2.7H_2O$, 0.184 mole of sodium nicotinate and 150 milliliters of NMP. They were heated to 220° C. with stirring in a stream of nitrogen, whereby 22.7 g of a distillate consisting mainly of water was removed. Then, the system was cooled to 170° C. and 0.6 mole of p-dichlorobenzene was added together with 50 milliliters of NMP. The system was sealed and heated in a stream of nitrogen. Polymerization was conducted for 2 hours at 230° C. and for 2 hours at 265° C. After the completion of the polymerization, the system was cooled, and the resulting polymer was washed with about 5 liters of hot water, subjected to repeated filtration, washed with methanol once, and then vacuum-dried overnight by heating to obtain a light-white granular polyphenylene sulfide. The yield and melt viscosity of the polymer were 96% and 115 Pa.s, respectively.

EXAMPLE 2

The procedure of Example 1 was repeated except that 0.31 mole of sodium nicotinate was added together with sodium sulfide instead of 0.184 mole of sodium nicotinate. As a result, a light-white granular polymer was obtained. The yield and melt viscosity of the polymer were 95% and 85 Pa.s, respectively.

COMPARATIVE EXAMPLE 1

The procedure of Example 1 was repeated except that 0.18 mole of sodium acetate was added together with sodium sulfide instead of 0.184 mole of sodium nicotinate. As a result, a light-gray granular polymer was obtained. The yield and melt viscosity of the polymer were 95% and 75 Pa.s, respectively.

The polymers obtained in the above-described Examples 1, 2 and Comparative Example 1 were compared with each other in terms of color tone and heat stability. The heat stability of the polymers was examined on the basis of the increase in viscosity when heat-treated for 2 hours at 250° C. The results are shown in Table 1.

TABLE 1

|  | Example 1 | Example 2 | Comp. Ex. 1 |
|---|---|---|---|
| Color tone of polymer | Light-white | Light-white | Light-gray |
| $\eta_i^*$ (Pa.s) | 115 | 85 | 75 |
| $\eta_c^{**}$ (Pa.s) | 277 | 203 | 610 |

*$\eta_i$: viscosity of the polymer before heat-treating
**$\eta_c$: viscosity of the polymer after heat-treating The results of the comparison show that the polymers produced with the addition of a pyridine carboxylate have improved color tone and heat stability.

EXAMPLE 3

The procedure of Example 1 was repeated except that 0.31 mole of sodium picolinate was added together with sodium sulfide instead of 0.184 mole of sodium nicotinate. As a result, a light-white granular polymer was obtained. The yield and melt viscosity of the polymer were 95% and 77 Pa.s, respectively.

EXAMPLE 4

The procedure of Example 1 was repeated except that, when p-dichlorobenzene was added, 0.0012 mole of 1,2,4-trichlorobenzene was added together with p-dichlorobenzene and NMP. As a result, a light-white granular polymer was obtained. The yield and melt viscosity of the polymer were 95% and 220 Pa.s, respectively.

EXAMPLE 5

The procedure of Example 1 was repeated except that 0.276 mole of lithium nicotinate was added together with sodium sulfide instead of 0.184 mole of sodium nicotinate. As a result, a light-white granular polymer was obtained. The yield and melt viscosity of the polymer were 93% and 208 Pa.s, respectively.

COMPARATIVE EXAMPLE 2

The procedure of Example 1 was repeated except that 0.18 mole of lithium acetate was added together with sodium sulfide instead of 0.184 mole of sodium nicotinate. As a result, a light-gray granular polymer was obtained. The yield and melt viscosity of the polymer were 92% and 155 Pa.s, respectively.

COMPARATIVE EXAMPLE 3

The procedure of Example 1 was repeated except that 0.18 mole of lithium benzoate was added together with sodium sulfide instead of 0.184 mole of sodium nicotinate. As a result, a light-gray granular polymer was obtained. The yield and melt viscosity of the polymer were 92% and 108 Pa.s, respectively.

The contents of heavy metals in the polymers obtained in the above-described Example 5 and Comparative Examples 2, 3 were determined. The results are shown in Table 2.

TABLE 2

|  | Heavy metal content (ppm) | | |
|---|---|---|---|
|  | Fe | Cr | Ni |
| Example 5 | 87 | 51 | 22 |
| Comp. Ex. 2 | 420 | 140 | 86 |
| Comp. Ex. 3 | 390 | 110 | 74 |

It will be understood from Table 2 that the polymer produced with the addition of a pyridine carboxylate has a lower content of heavy metals and therefore has a favorably high purity.

As is obvious from the above explanation, the present invention provides a polyarylene sulfide having a high molecular weight, a high purity, excellent color tone and excellent heat stability.

What is claimed is:

1. A process for producing a polyarylene sulfide, which comprises reacting a dihalogenated aromatic compound and a sulfur source in an organic amide solvent and in the presence of an alkali metal salt a pyridine-carboxylic acid of the formula:

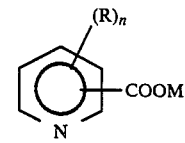

wherein R is an organic group having 1 to 20 carbon atoms, M is an alkali metal, and n is an integer having a value of 0 to 4, in an amount of 0.05 to 3 moles per mole of said dihalogenated aromatic compound, at a temperature of from 200° to 300° C. for 0.5 to 10 hours.

2. The process according to claim 1 wherein the amount of the alkali metal salt of pyridine-carboxylic acid is 0.1 to 2 moles per mole of the dihalogenated aromatic compound.

3. The process according to claim 1 wherein the alkali metal salt of the pyridine-carboxylic acid is selected from the group consisting of lithium nicotinate, sodium nicotinate, potassium nicotinate, sodium picolinate, sodium isonicotinate, sodium 2-methylnicotinate, sodium 4-methylnicotinate, sodium 5-methylnicotinate, sodium 6-methylnicotinate, sodium 3-methylpicolinate, sodium 5-methylpicolinate, sodium 2,4-dimethylnicotinate, sodium 2,5-dimethylnicotinate, sodium 2,6-dimethylnicotinate, sodium 4,6-dimethylnicotinate, sodium 5,6-dimethylnicotinate, sodium 3,5-dimethylpicolinate, sodium 4,6-dimethylpicolinate and a mixture thereof.

* * * * *